INVENTORS
WILLIAM A. MILLER
ALTON C. SLEGGS
BY

May 19, 1970 W. A. MILLER ET AL 3,513,019
COATED BETA-SILICON CARBIDE WHISKERS AND
PROCESS FOR THEIR PRODUCTION
Filed Jan. 3, 1967 2 Sheets-Sheet 2

INVENTORS
WILLIAM A. MILLER
BY ALTON C. SLEGGS

United States Patent Office 3,513,019
Patented May 19, 1970

---

3,513,019
COATED BETA-SILICON CARBIDE WHISKERS AND PROCESS FOR THEIR PRODUCTION
William A. Miller and Alton C. Sleggs, Jamestown, N.Y., assignors, by mesne assignments, to The Carborundum Company, Niagara Falls, N.Y., a corporation of Delaware
Filed Jan. 3, 1967, Ser. No. 606,645
Int. Cl. C04b 41/06
U.S. Cl. 117—123                              6 Claims

ABSTRACT OF THE DISCLOSURE

Beta-silicon carbide whiskers coated with a glassy material consisting essentially of silica and alumina are produced by surrounding a substantial portion of a permeable vessel in which a carbonaceous material, silica and alumina are incorporated, with a siliceous, aluminous melt containing a glass-forming oxidic material, thereby producing a temperature of at least about 1400° C. within the vessel, the coated whiskers being formed therein.

---

This invention relates to coated silicon carbide whiskers and to a process for the production thereof. The term "whisker" is used herein to denote an acicular single crystal characterized by a large aspect (length to diameter) ratio and a high degree of crystal perfection.

Silicon carbide whiskers and various processes for the production thereof have been quite extensively described in the literature in recent years. Such whiskers have been reported to occur in two different crystalline varieties, viz., the alpha, or hexagonal (crystal habit and the beta, or cubic habit.

The present invention is concerned with a unique and novel product comprising beta-silicon carbide ($\beta$-SiC) whiskers coated with a glassy material which consists essentially of silica and alumina, and with a novel process for producing such coated whiskers. The process involves surrounding a substantial portion of a permeable vessel in which a carbonaceous material, silica and alumina are incorporated, with a siliceous, aluminous melt containing a glass-forming oxidic material, thereby producing a temperature of at least about 1400° C. and preferably in the approximate range of 1400–1700° C. within the vessel, the coated whiskers being formed therein. The process is conveniently carried out by placing the vessel in a container made of any suitable refractory material and pouring the melt into the container and around the vessel therein.

The invention will be described in detail in conjunction with the accompanying drawings wherein.

Figure 1:
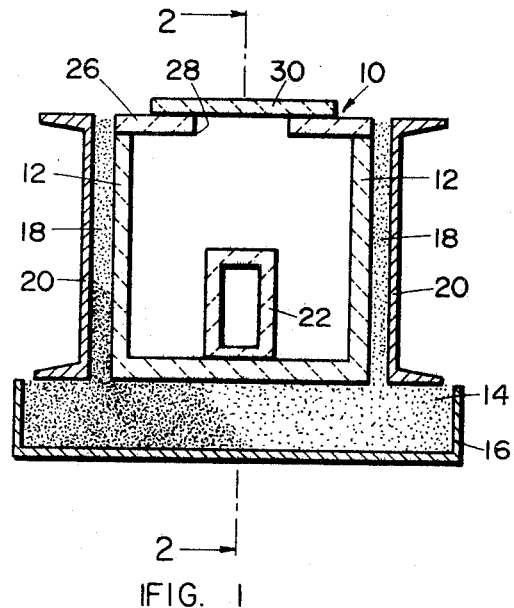
FIG. 1 is a vertical tranverse section through apparatus suitable for carrying out the invention.
Figure 2:
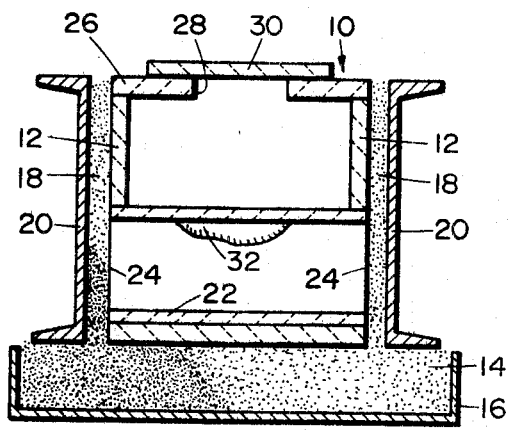
FIG. 2 is a vertical longitudinal section through the vessel and container shown in FIG. 1 taken on line 2—2 thereof, illustrating the formation of a mass of coated $\beta$-SiC whiskers within the vessel.

Referring to the drawings, and particularly to FIGS. 1 and 2, wherein like numerals indicate like parts, apparatus suitable for the production of $\beta$-SiC whiskers according to the process of the invention is comprehensively designated 10. The container 12 which may conveniently be formed of refractory plates held together by suitable means (not shown) such as bands or clamps, is supported on a bed of refractory insulating material 14 such as alumina powder contained in a metal pallet 16, and has, around its side walls, like insulating material 18 which is contained within a flask that may be made up of interconnected, outwardly facing channels 20. An elongated vessel 22 of recmtangular cross section is arranged in container 12, resting on the bottom thereof and extending through corresponding openings 24 in opposite walls of container 12. Container 12 is provided with a top 26 which has an opening 28 through which the melt may be poured. A lid 30 adapted to cover opening 28 is provided.

Container 12 and its top 26 and lid 30 may be formed from any material or materials which will withstand the temperature of the melt, for example, bonded refractory grain or graphite. The permeable vessel 22 incorporates, in addition to silica and alumina, a carbonaceous material which may be graphite and/or some other form of free carbon and/or a carbonizable substance; for example, it may be composed of graphite bonded with a siliceous, aluminous material such as kaolin or other suitable clay, or a siliceous, aluminous refractory grain bonded with a carbonizable resin. The vessel must, of course, be formed of a composition capable of withstanding the temperature of the melt and the walls should have sufficient porosity to be permeable by gases without permitting unrestricted flow of the melt therethrough.

In carrying out the process of the invention, any suitable means such as an electric arc furnace is employed to prepare a siliceous, aluminous melt containing a glass-forming oxidic material, and preferably a small amount of carbon. A sufficient quality of the melt to surround the top and sides of vessel 22 is poured into container 12 through opening 28, which is then covered with lid 30; and the top 26 of the container, including the lid, is covered with a layer of suitable refractory insulating material, to reduce the cooling rate and thereby provide a maximum duration of a sufficient high temperature within vessel 22 for the production of the coated whiskers.

The invention will be further described in conjunction with the following example which is intended to illustrate, and not to limit, the concepts of the invention.

EXAMPLE 1

Apparatus is set up substantially in accordance with FIGS. 1 and 2, employing a preformed molded vessel comprising about 80% graphite of ¼ inch and finer size so as to provide a satisfactory premeability and bonded with about 20% of vitrified kaolin. The vessel is 60 cm. long, 15 cm. in height and 10 cm. in width, with a wall thickness of about 2.5 cm., the refractory container being about 40 cm. in height and 60 cm. square.

Into the container is poured an electrically fused melt having the approximate composition 75% alumina, 23% silica, and 2% sodium oxide; a small amount of carbon, of the order of 0.1–0.2%, is also present as are at least traces of various oxides. The temperature of the melt when poured is about 180° C. After pouring the melt and closing the opening of the container, the container is covered with a layer of powdered alumina to retard cooling. The melt solidifies over a period of about 4 hours, during which time the temperature in the vessel is raised to at least 1500–1600° C. and then gradually drops as the entire assembly is allowed to cool to room temperature. A mass of coated $\beta$-SiC whiskers is recovered from the vessel, the mass forming at a location designated at 32 in FIG. 2.

Figure 3:
FIG. 3 is a photograph of such a mass of coated $\beta$-SiC whiskers as produced.

FIG. 3 shows such a mass of coated $\beta$-SiC whiskers as formed. The mass is very light, typically having a density of the order of about 0.02 g./cc., and is of a fluffy, spongy consistency. It primarily consists of interwoven coated whiskers but may include small particles of impurities.

Figure 4:
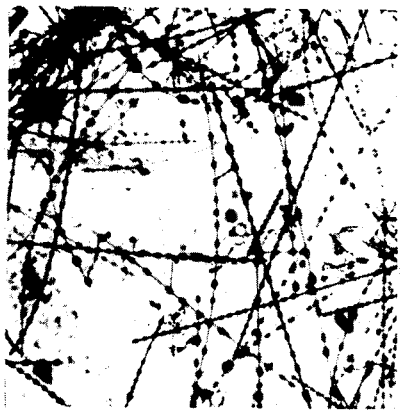
FIG. 4 is a photomicrograph (about 100×) showing individual coated $\beta$-SiC whiskers according to the invention.

FIG. 4 is a photomicrograph of about 100× magnification of a portion of such a mass of coated $\beta$-SiC whiskers. In the figure, it is impossible to distinguish the whiskers from the glassy coating material, except for the enlarged portions or beads of the latter which occur at spaced intervals along the length of the whiskers.

However, an examination of the individual whiskers under higher magnification shows that the glassy material is present in the form of a substantially continuous coating on each of the whiskers, this coating encasing the whisker to form a sheath or coaxial envelope which continuously surrounds the whisker from one bead to the next, the beads also surrounding the whiskers and forming part of the envelope.

Analysis of various samples of coated whiskers formed according to the method of the invention indicate that the silica-alumina coating may constitute from 90% or more of the weight of the coated whiskers to less than 65% thereof, the proportion of beta-silicon carbide whiskers conversely ranging from less than 10% to more than 35%. Analysis of various samples of the glassy coatings indicate that the silica therein may be present in amounts ranging from 50% or less to 85% or more, the alumina ranging conversely from less than 15% to more than 50%. Most of the samples of coated whiskers which have been analyzed appear to contain very small amounts of sodium in the glassy material.

While no definitive theory can be advanced to account for the formation of coated beta-silicon carbide whiskers by the method of the present invention, and while the invention is not to be considered as being limited to any uarticular mechanism, it has been suggested that at the high temperatures generated within the vessel, the carbon incorporated in the vessel reacts to form a reducing atmosphere, which is probably largely carbon monoxide, within the vessel; and that under such conditions of temperature and atmosphere, beta-silicon carbide whiskers are formed from silica in the melt and/or the vessel. It has further been suggested that the silica-alumina coating resulting from the presence of these materials in the melt and/or vessel occurs as a glass by virtue of the presence in the melt of a glass-forming material, such as the sodium oxide in the example, since in the absence thereof the silica and alumina would tend to occur in a crystalline form.

Uncoated beta-silicon carbide whiskers may readily be obtained from the coated whiskers produced according to the method of the invention. One simple way of accomplishing this is to treat the whisker mass, as formed, with hydrofluoric acid to dissolve the silica-alumina glassy coatings, thereafter separating the individual whiskers from their matted form, for example by agitating the mass with a suitable inert liquid such as water or alcohol and thereafter removing the liquid, as by filtration.

Measurements on whiskers produced by the method of the invention from which the coatings have been removed indicate that they vary in length from about 0.1 to about 6 mm., and in diameter from submicron to about 10 microns. They have tensile strengths ranging from about a quarter million p.s.i. (17,500 kg./sq. cm.) to well over 1.5 million (105,000 kg./sq. cm.) and, as is well-known, such whiskers are very useful for the formation of reinforced composite bodies which may be prepared by known methods and which generally comprise such whiskers embedded in a resin matrix. Moreover, the coated whiskers themselves are well suited to such use. Thus the coated whiskers may be treated with any suitable matrix-forming resin, e.g., a phenol-formaldehyde resin, and the resin cured to form a coated whisker-reinforced resin composite, the process being carried out by well-known methods.

Except as otherwise specified, all references herein to percentages refer to percentages by weight.

While the invention has been described in connection with specific embodiments thereof, it will be understood that it is capable of further modification, and this application is intended to cover any variations, uses or adaptations of the invention following in general the principles of the invention and including such departures from the present disclosure as come within known or customary practice in the art to which the invention pertains and as may be applied to the essential features hereinbefore set forth, and as fall within the scope of the invention or the limits of the appended claims.

We claim:

1. A beta-silicon carbide whisker having thereon a substantially continuous sheath of a glassy material consisting essentially of silica and alumina in the proportions of from about 50% to about 85% silica and from about 15% to about 50% alumina, the ratio by weight of said whisker to said sheath ranging from about 10:90 to about 35:65.

2. A product as defined in claim 1 wherein said sheath has portions of increased diameter occurring at spaced intervals along the length of said whisker.

3. A product as defined in claim 1 wherein said whisker has a diameter between submicron and about 10 microns and a length between about 0.1 millimeter and about 6 millimeters.

4. A fluffy, light, spongy, interwoven mass of beta-silicon carbide whiskers having sheaths thereon, as defined in claim 1.

5. A fluffy, light, spongy, interwoven mass of beta-silicon carbide whiskers having sheaths thereon, as defined in claim 2.

6. A fluffy, light, spongy, interwoven mass of beta-silicon carbide whiskers having sheaths thereon, as defined in claim 3.

References Cited

UNITED STATES PATENTS 3,371,995  3/1968  Pultz _____ 117—106 XR
3,407,090  10/1968  Hertl _____ 117—106

ALFRED L. LEAVITT, Primary Examiner
W. F. CYRON, Assistant Examiner

U.S. Cl. X.R.
117—169